C. A. HAAS.
CARBURETER.
APPLICATION FILED NOV. 30, 1908.
932,465.
Patented Aug. 31, 1909.
3 SHEETS—SHEET 1.
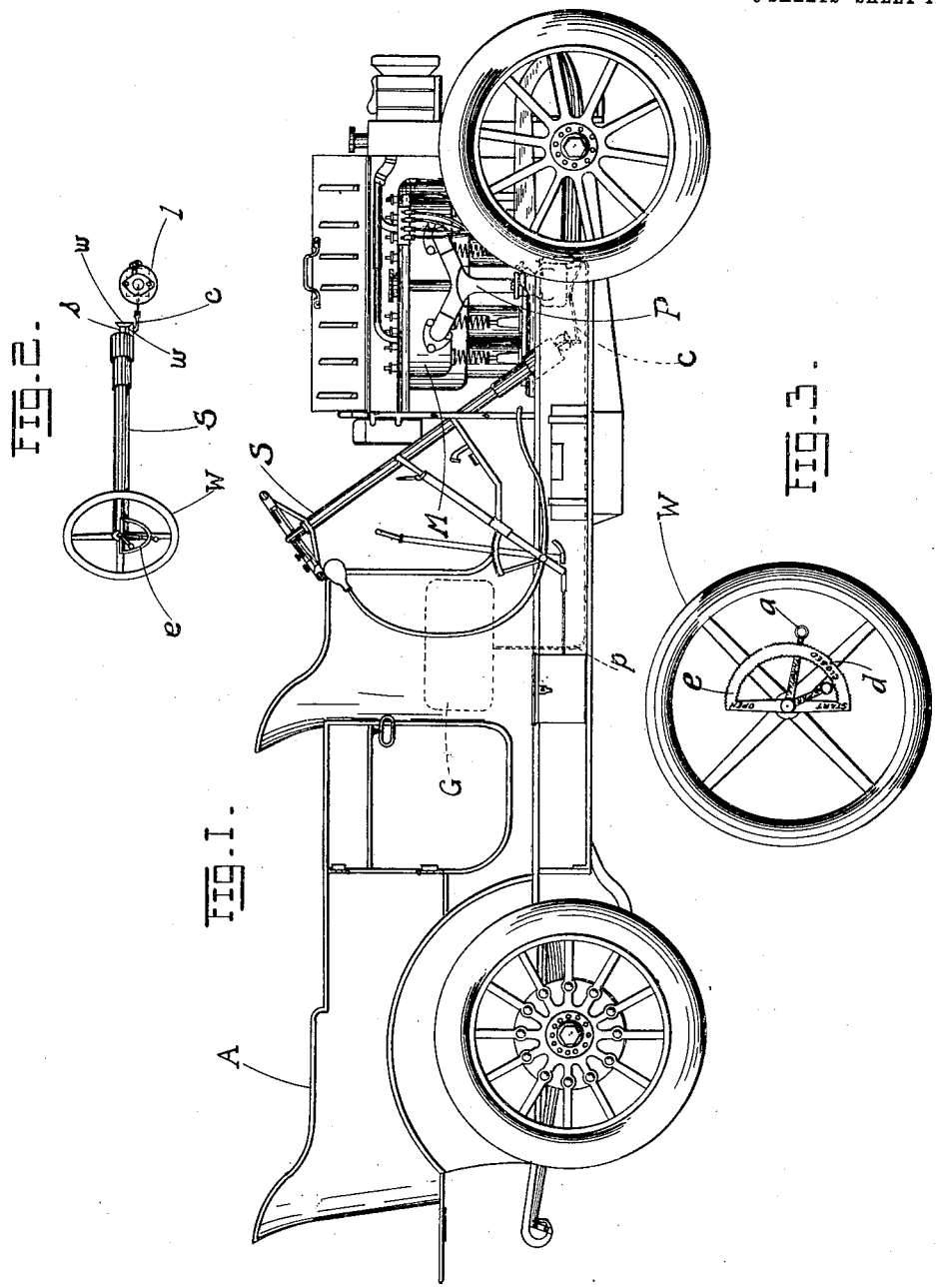
WITNESSES:
Harry A Bermes
Jos. A Michel
INVENTOR.
Cyrus A. Haas
BY Emil Starck
ATTORNEY.

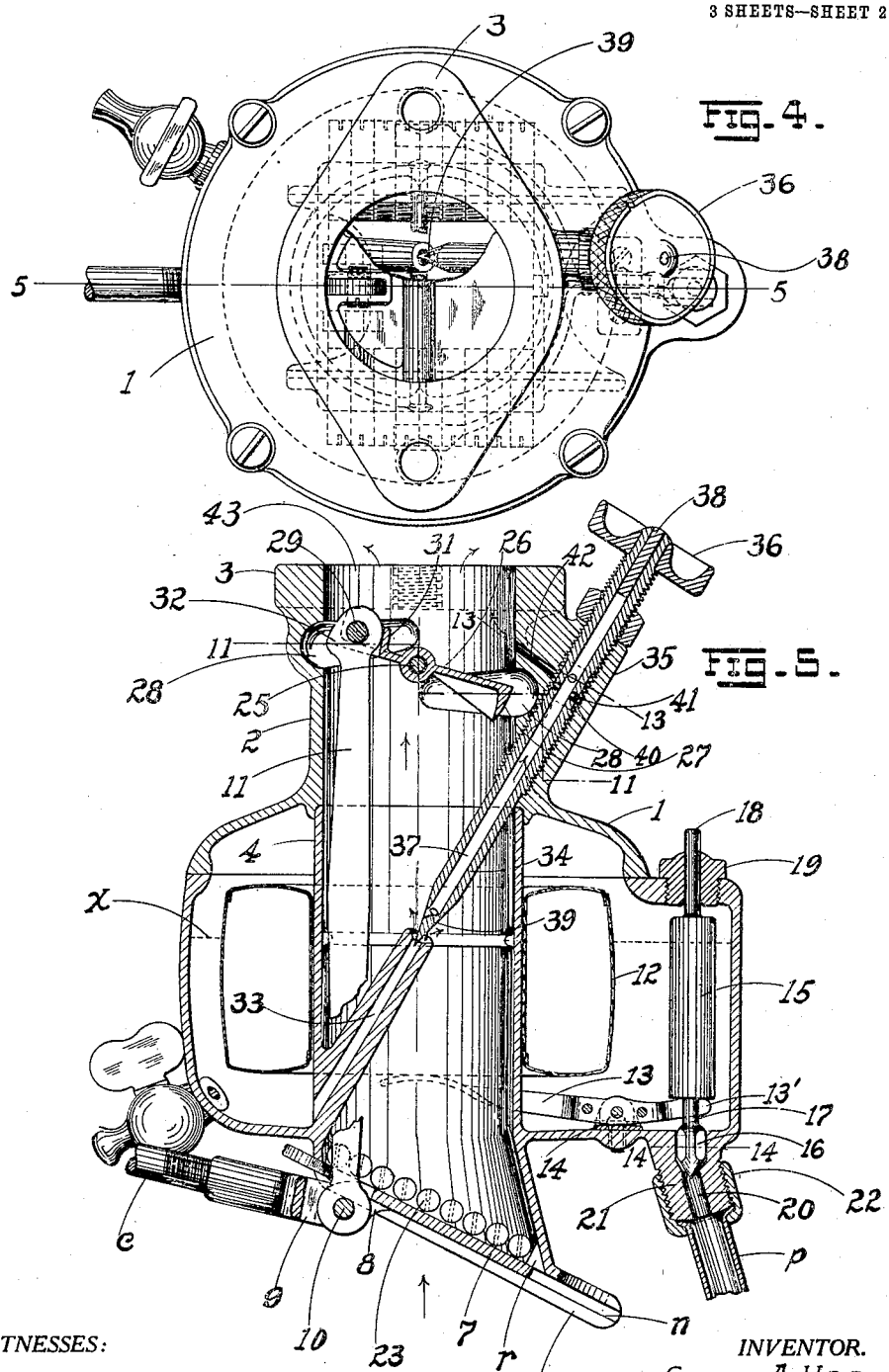

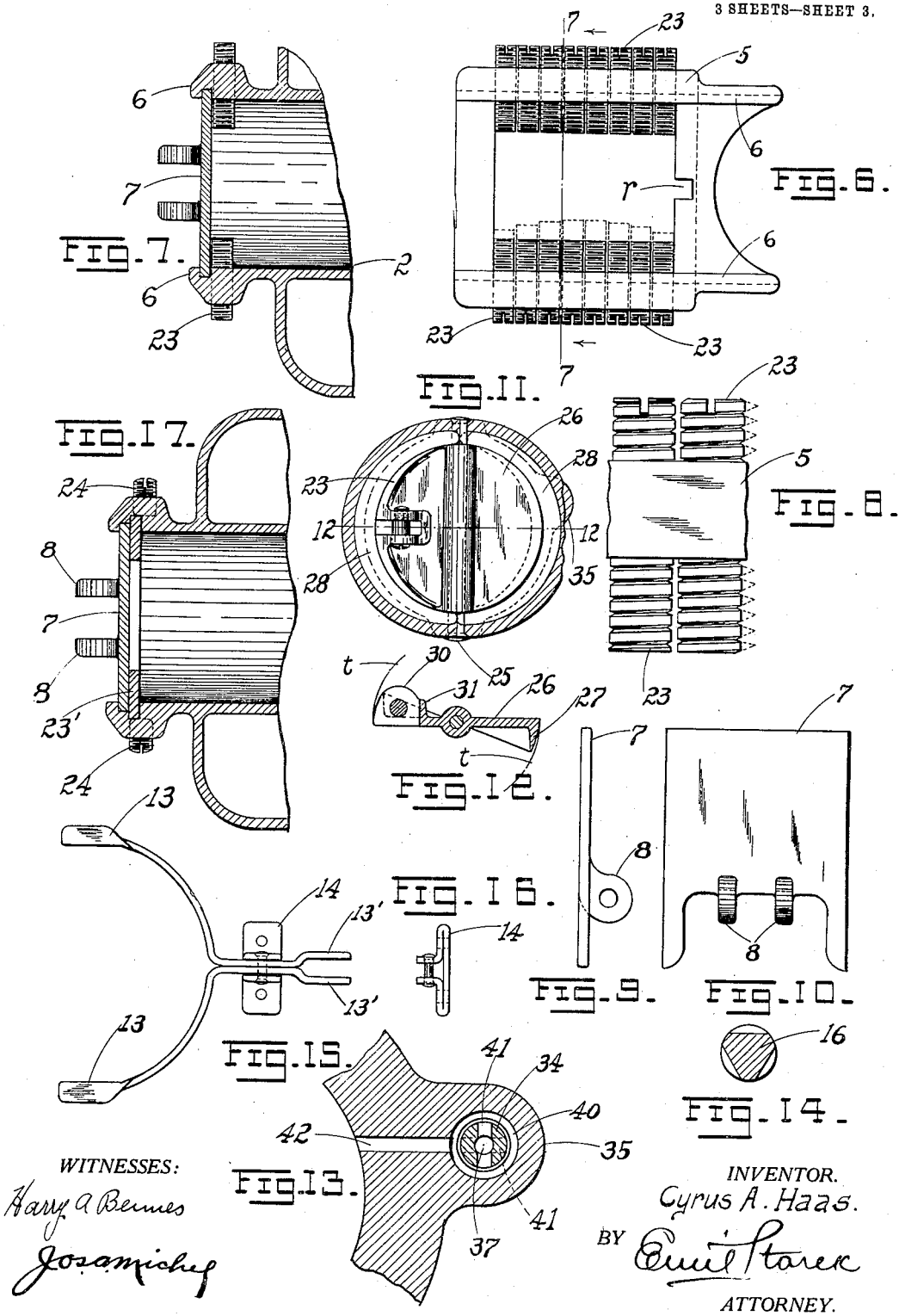

UNITED STATES PATENT OFFICE.

CYRUS A. HAAS, OF ST. LOUIS, MISSOURI, ASSIGNOR OF ONE-HALF TO IMPERIAL BRASS MANUFACTURING COMPANY, OF CHICAGO, ILLINOIS, A CORPORATION OF ILLINOIS.

CARBURETER.

932,465.   Specification of Letters Patent.   Patented Aug. 31, 1909.

Application filed November 30, 1908. Serial No. 465,306.

*To all whom it may concern:*

Be it known that I, CYRUS A. HAAS, citizen of the United States, residing at St. Louis, State of Missouri, have invented certain new and useful Improvements in Carbureters, of which the following is a full, clear, and exact description, reference being had to the accompanying drawings, forming a part hereof.

My invention has relation to improvements in carbureters; and it consists in the novel construction and arrangement of parts more fully set forth in the specification and pointed out in the claims.

In the drawings, Figure 1 is a side elevation of an automobile showing my invention applied thereto; Fig. 2 is a top plan of the steering wheel and staff showing the sector for the spark and throttle levers; Fig. 3 is a face view of the steering wheel and spark and throttle levers and sector on a larger scale; Fig. 4 is a top plan of the carbureter; Fig. 5 is a vertical section on the line 5—5 of Fig. 4; Fig. 6 is a bottom plan of the square intake end of the carbureter showing the series of screws which collectively serve to adjust the size of the opening or throat through which the air gains access to the carbureter chamber, with air-valve or slide omitted; Fig. 7 is a cross-section on line 7—7 of Fig. 6 with air-valve or slide in place; Fig. 8 is an elevational detail on a large scale showing two of the screws which enter into the construction of the intake of the carbureter; Fig. 9 is an edge view of the air-valve or sliding shutter; Fig. 10 is a bottom plan view thereof; Fig. 11 is a cross section on the broken line 11—11 of Fig. 5, parts being broken; Fig. 12 is a vertical section of the butterfly gas-valve only, the section being on the line 12—12 of Fig. 11; Fig. 13 is an enlarged sectional detail on the line 13—13 of Fig. 5, showing the port or passage leading from the passage-way of the hollow stem of the needle-valve which controls the aspirator; Fig. 14 is a cross-section on line 14—14 of Fig. 5 showing construction of the feed-valve; Fig. 15 is a top plan of the oscillating frame connecting the float with the feed-valve; Fig. 16 is an edge view of the bracket to which said frame is pivoted; and Fig. 17 is a section similar to Fig. 7 but showing a throat formed by an open plate or frame in lieu of the screws shown in said Fig. 7.

The present invention relates to a type of carbureter specially applicable in connection with motors for automobiles or self-propelled vehicles.

The objects of the invention are—

(1) To provide a construction which will insure a constantly uniform and perfect mixture of gas and air to the motor during all periods of either the opening or closing movement of the throttle or gas valve (usually termed butterfly valve), such uniformity being dependent not upon a fixed design of carbureter, but on devices which may be specially adjusted to effect a perfect mixture at and for any point of the throttle stroke. Such special adjustment becomes necessary by reason of engine conditions which change with the wear of the parts, the "general adjustment" being insufficient for purposes of securing perfection in the mixture throughout an entire throttle stroke.

(2) To provide means for enriching the starting mixture without the use of "priming devices", thereby avoiding the flooding of the carbureter, (a result so characteristic of priming devices), and making it possible to "crank" with a constant mixture of any desired proportions, such proportions depending on the initial position to which the throttle lever and valves (air and gas) have been set for cranking, which position is determined by the operator or chauffeur according to weather conditions and length of time the engine has stopped. This same valve combination when set to starting position may be used just before the motor is stopped to charge the engine cylinders with a rich mixture suitable for subsequently starting the motor without cranking by simply turning the spark switch to close the electric circuit thereby "starting on the spark" as termed in automobile parlance.

(3) To provide a throttle or gas valve which will open gradually so as to offset the high vacuum present in the chamber located between the valve and the engine when the valve is in a closed or partially closed position, thereby preventing any sudden opening and effecting an acceleration of the motor by uniform increments.

(4) To provide a suitable passage-way from the mixing chamber of the carbureter to the chamber aforesaid (such passage-way being preferably, though not necessarily, through the stem of the general-adjustment needle valve) for conducting to the motor a sufficient quantity of proper mixture for either a closed or partially closed position of said valve, without the necessity of providing the mixing chamber from which said mixture is drawn with either a hot-air intake or a constriction for the air as is now usually done, such constriction being objectionable for a full-open throttle (gas valve), as it retards the flow of the mixture to the motor, and hence retards the speed and power of the engine. The passage-way too has the advantage in that it dispenses with the necessity of a supplemental air-puppet valve usually relied on to overcome the deleterious effects of the constriction.

A further object of the present invention is (5) to maintain a certain predetermined level of gasolene in the float chamber of the carbureter.

A further object is (6) to utilize as light a feed-valve as possible to reduce to a minimum the vibrations thereof and hence minimize the danger of flooding the float chamber. In this way I succeed in maintaining a substantially constant level in the float chamber. In lieu of a gravity valve I may substitute any equivalent in the shape of a spring valve, which though less liable to vibrate when the vehicle is passing over rough ground, has the disadvantage in the danger of changing its tension and hence bringing about a change in the gasolene level. The choice of feed-valves would depend on, and be dictated by, practical considerations.

A further object is (7) to control the aspirator with a specially constructed "general-adjustment" needle valve which will not only control the quantity of discharge to meet atmospheric conditions thereby producing a perfect general mixture, but will serve as a vacuum by-pass for the mixture to the motor for a closed or partially closed position of the throttle.

The invention consists in other features of construction the advantages of which will be fully apparent from a detailed description thereof which is as follows:—

Referring to the drawings, A, represents an automobile of conventional design, being provided with a gasolene-tank G, from which leads a supply-pipe $p$ to the gasolene chamber of the carbureter.

S, represents the hollow steering staff and W the steering wheel, the staff receiving the shaft $s$ to one end of which is secured the throttle-lever $a$ and to the opposite lower end the bevel gear wheel $w$ with which meshes a bevel gear wheel $w'$ to the face of which is pivotally coupled the adjacent end of a link $c$ all as fully understood in the art and forming no part of the present invention.

The carbureter forming the subject-matter of the present invention comprises an outer float chamber 1 preferably made in two sections, the upper section being provided with a central extension 2 which terminates in a flange 3 for bolting to the base of the intake manifold pipes P leading to the motor M. The extension 2 engages the inner vertical cylindrical pipe or flue 4 cast with the lower section, the flue 4 being extended downward below the float-chamber proper in the shape of an intake mouth flaring and inclining toward the front, and assuming preferably a rectangular form at the opening of the mouth, such opening being surrounded by the oblong frame 5. The front of the frame 5 is concave (Fig. 6) the sides being provided with suitable lips 6, 6, forming grooves or ways $n$ for the sliding shutter or air-valve 7. The rear end of the plate forming the shutter has a portion thereof removed so as to leave a permanent opening for the passage of air (Fig. 10), the plate having disposed at the edge of such opening the downwardly projecting lugs or ears 8, 8, to which is pivotally secured the adjacent fork 9 screwed to the throttle lever link $c$. From the connections described it will be seen that a throw of the throttle lever in proper direction will either draw on or push the link $c$ according to the direction the lever is swung and thereby reciprocate the shutter 7 in its ways or grooves $n$ to an open or closed position or any intermediate position. These features however, are well understood and I make no claim to the means for controlling or moving the air shutter from the throttle lever. It may be stated at this point that the ears 8 embrace the fork members 9, 9, from the outside, the hinge pin 10 being passed through the parts thus positioned. The pin 10 in addition passes through the lower end of a throttle-operating and controlling link 11 which engages the hinge pin between the fork-members 9, 9. (Fig. 5).

Located within the float chamber 1, and loosely encompassing the pipe 4 (which, together with its lower flaring portion and the upper extension 2 below the throttle valve may be regarded as the mixing chamber) is a float 12, the base of the float resting on the arms 13, 13 of an oscillating frame pivoted to a bracket 14 at the bottom of the float chamber, the arms 13, 13, encompassing the mixing chamber as shown (Fig. 5). The opposite end of the float-supporting frame terminates in the fork members 13', 13' which support the body portion 15 of the float feed-valve 16 the latter being connected to the body 15 by a neck 17, the upper end of the part 15 terminating in a guide-stem 18 which passes through a bearing 19 on the float chamber. The valve 16 is preferably triangular in cross-section with rounded corners (Fig. 14) and terminating in a conical or needle portion (Fig. 5) which controls the port or passage 20 formed in the nipple or boss 21 to which the pipe $p$ is directly secured by a nut or union 22. Of course any other suitable connection would answer the purpose. The dotted line x in Fig. 5 represents the normal level of the gasolene which level should be constant.

As the air valve or shutter 7 is reciprocated in its ways n by proper manipulation of the throttle lever a, it cuts off from, or admits to, the mixing chamber more or less air according to the position assumed by the valve, though in its fully rearwardly retracted position as shown in Fig. 5, some air is permitted to enter the chamber through the rear cut-away portion of the valve, to complement the gas admitted to the motor for starting purposes as subsequently to be explained. The air is admitted to the mixing chamber through the intake mouth bounded by the frame 5 (which may be any shape), but in order to effect a perfect mixture for general service, this influx of air must be carefully adjusted apart from the general control thereof by the valve 7, and for this purpose I resort to the following devices:—Passed through opposite sides of the frame 5, and preferably above the ways n of the sliding shutter or air-valve 7, are series of juxtaposed adjusting screws or air cut-offs 23, in which the threads as originally cut (see dotted lines in Fig. 8) are ground down so that the screws may be mounted as close together as possible and the spaces between adjacent screws so reduced that they may be ignored. The inner projecting portions of the screws collectively form a wall on each side of the intake mouth, the available opening for the influx of air into the mixing chamber depending on the distance between the adjacent edges of these walls. For a perfect mixture these edges need not be parallel, and in Fig. 6 one set of screws is shown adjusted inwardly, the inner ends of the screws being disposed along a curve. The size or area of this available air opening or throat defined by the screws as finally adjusted determines what the size of opening shall be to furnish the necessary complement of air to the perfect explosive mixture of a given type of motor operating under normal and general service conditions. Should a motor in time suffer undue wear and its running conditions materially change, so that the area of the throat or opening defined by the original setting of the screws no longer admits the proper complement of air to form a perfect mixture, a new adjustment might be necessary. Since such adjustments would however, be infrequent, I may for a given motor determine what the precise area of the throat or air opening shall be, by a careful adjustment of the screws 23, and then in actual practice may substitute for the screws so adjusted a single sliding throat-plate 23' as seen in the modification in Fig. 17. A number of such plates with different shaped openings may be kept on hand to take the place of a throat formed by the more costly screws, and slipped into position as needed, the clamping screws 24 being used to secure the plate in place. As shown both the screws 23 and throat plate 23' are mounted over the air-valve, but they might be mounted below the valve without departing from my invention. In lieu of screws 23 I may substitute slides or plates for cutting off or intercepting the air flowing into the mixing chamber.

In order to explain more fully the precise manner of availing ourselves of the adjustment feature furnished by the screws 23 (or their equivalent) it may be well to cite a specific example. Thus, suppose that when the air-valve has been moved along the intake opening to a position corresponding say to a quarter of the full open position of the throttle or gas valve, and that for this position of the valves the mixture is perfect. Suppose that by the time the valves have been shifted to a position corresponding to a full open position of the throttle valve and the mixture be found to be imperfect. The operator thereupon adjusts the particular screws which happen to be adjacent to the end of the air-valve at such full open position but does not in any wise disturb the screws which occupied a position at the end of the valve when the latter was at quarter stroke; and for the purpose of my invention, it must be understood that the adjustment of the mouth or opening controlled by the air valve may be effected by the screws (or their equivalent) at any point along the stroke of said valve. So that again, should the mixture be perfect at half stroke and imperfect at quarter stroke, no screws are disturbed except those which are adjacent to the end of the slide when at such quarter stroke. In this way a perfect mixture may necessitate a series of adjustments along different stages of a stroke of the valve so as to give us an air opening of almost any configuration for a given type of engine, one example of such configuration being shown by the dotted positions of the screws in Fig. 6. This shape of opening when once established for a carbureter operating in conjunction with a given type of motor will determine the shape for every carbureter on that type of engine. The "end" of the valve adjacent to which the adjustment of the screws is made is, in the present construction the rear curved end (Fig. 10) that being the end which first covers and uncovers the intake as the valve is moved back and forth.

Mounted rotatably on a diametrically disposed shaft or pin 25 at the upper end of the vertical mixing chamber and directly over the air-valve 7, is the throttle, or butterfly gas valve 26, the same being in the form of a disk from the edges of which project in opposite directions the flanges 27, 27, whose sides taper toward the axis of the valve (Figs. 5, 12), the outer faces of the flanges being convex, and interior and tangent to, the arc $t$ described by the edge of the disk about the axis thereof as a center. The object of curving the flanges 27 interiorly to the surface described by the edge of the disk in its rotation, will presently appear. Formed in the walls of the mixing chamber along superposed planes are semi-annular pockets 28, 28 deepest in the middle as shown, the ends of the pockets coming vertically under one another, so that jointly the pockets encircle the cylinder forming the mixing chamber. The disk 26 is recessed to receive the upper end of the link 11 which is coupled pivotally to the disk, the connection being effected by a screw pin 29 passed through the link and the ears 30 bounding the sides of the recess, the base of the recess being protected by a lip 31 as shown. The outer edge of the upper pivotal end of the link 11 is provided with a nose 32. The purpose of the nose 32 and the lip 31 will be apparent if we assume the valve 26 swung to closed position, that is to say to a position at right angles to the axis of the cylinder 2. Were it not for the nose 32 and lip 31, there would be considerable leakage of the gas for the closed position of the throttle, but for such position the nose 32 comes up close to the cylinder wall, and the lip 31 comes up close to the rear edge of the pivotal end of the link 11, so that the leakage is reduced to a minimum.

The gas nozzle or aspirator 33 is formed with the cylinder 4 leading from the bottom of the float chamber, inclined at a suitable angle, and terminating at the axis of the cylinder or mixing chamber at a point above which the level of the liquid in the float chamber should not be permitted to rise. An aspirator with its discharge mouth in the relative position described can never flood the mixing chamber no matter to what extent the carbureter may be tilted in the passage of the automobile over grades or curves, because the liquid level could never rise above said mouth. The surface of the liquid always remaining level, and the mouth of the aspirator being substantially at the center of the body of liquid surrounding it, the entire carbureter would simply revolve about the surface of the liquid with the mouth of the aspirator as an axis, and since the mouth could never become depressed below the plane of this surface, the liquid could never flood the chamber. The discharge mouth of the aspirator is controlled by the general adjustment screw-needle-valve 34 having a bearing 35 formed in the wall of the extension 2, the valve being actuated by the milled head 36. The valve terminates in a needle as well understood; but in the present construction the valve stem is preferably made hollow thus forming a vacuum passage-way 37 closed at the upper end by a plug 38; at the base, immediately above the needle, the passage-way 37 has leading therefrom a series (three) of radiating ports 39 which open into the mixing chamber. At a suitable point in the valve-bearing 35 the cross section of the valve 34 is somewhat reduced so that there is formed a recess 40 which thereby forms an annular chamber around the valve-stem (Fig. 13). This chamber communicates with the inner passage 37 of the stem through ports 41, and from the chamber leads a passage 42 to the space or vacuum chamber 43 formed above or beyond the gas throttle valve and with which the pipes P leading to the motor are in direct communication. So that the ports 39, passage 37, ports 41, chamber 40, and passageway 42 collectively form a by-pass for the mixture to reach the chamber 43 beyond the throttle valve when said valve is closed or partially closed. Of course this by-pass need not be through the valve-stem 34, for it may be through a separate tube leading from the aspirator to said chamber 43 and yet fall within the contemplation of my invention. The arrangement just described however, is the preferred one as it is less complicated. The rear edge of the front side of the frame 5 is provided with a recess $r$ (Figs. 5, 6) to admit the link 11 when the air-valve 7 has been shifted to full open position.

The operation of the device may be described as follows:—The manner of controlling the movements of the slide or air shutter 7 by a proper manipulation of the throttle lever $a$ has already been explained, this feature too being old and well understood. When the valve 7 has been retracted rearwardly its full limit as shown in Fig. 5, to close the intake mouth of the mixing chamber, a certain quantity of air is still free to pass into said chamber through the rear opening formed in said valve as already explained. In thus moving the air-valve to its closed position it oscillates the throttle or gas valve 26 backward through the medium of the link connection 11, the throttle assuming the position shown in Fig. 5.

By the "backward" oscillation of the throttle or gas valve 26 is meant an oscillation corresponding to a downward oscillation of the right hand end of said valve as shown in Fig. 5, as opposed to a "forward" oscillation or an upper swing of such end. Since under these circumstances a minimum complement of air is admitted into the mixing chamber the mixture will be unusually rich in gas and it is this enriched mixture which is availed of for cranking purposes. The throttle being thus partially open (Fig. 5) the mixture is drawn into the motor, the latter being cranked with the rich mixture thus admitted thereto; but, as previously stated, if it be desired to dispense with cranking and in lieu thereof "start on the spark" the valves may be set to the combination as shown in Fig. 5 by the throttle lever a just before stopping the motor, whereby the engine cylinders are charged with a rich mixture by the momentum of the parts after the electric spark has been shut off, when by simply closing the electric circuit with the spark switch, the machine will "start on the spark". So that the operator may either crank or not as suits his pleasure depending on circumstances. The rich mixture with which the cylinders are charged for starting purposes as here related, is not the "perfect" mixture contemplated for general running service and must not be confounded therewith. The "perfect" mixture referred to is that which remains constant and uniform for every position of the throttle during either stroke thereof in moving from a closed to a full-open position, or vice versa, and is a mixture which is assured by the adjustment of the opening of the intake mouth controlled by the air valve 7. A "perfect" mixture therefore is one which does not fluctuate or change while the throttle is moving from closed or neutral to full open position, (or vice versa), and is necessary to insure uniform results. Once the motor is started, the operator shifts the slide 7 to open position (to the right as shown in Fig 5) in which movement it will oscillate the gas throttle forwardly to open position, the full open position of the throttle being when the disk 26 has assumed a vertical position or one parallel to the axis of the mixing chamber. The mixture is "perfect" from the moment the throttle is passing from the closed to full open position, the proper complement of air being admitted to mix with the gasolene discharged by the aspirator 33, the necessary suction on the mixture being exerted by the vacuum present in the chamber 43 beyond the throttle. The "perfection" and constancy of the mixture is due to the fact that with a constantly increasing opening of the throttle there is a corresponding increase of air opening uncovered by the air-valve, the area and configuration of said air opening being previously determined by a proper adjustment of the screws 23, or by their equivalent throat-plate 23' as previously explained.

After the machine is started either by cranking or "on the spark," the valves are shifted first to closed or neutral throttle (sometimes called low throttle) by swinging the lever a to the "closed" notch d (Fig. 3), the gas valve 26 oscillating forward from its cranking position (Fig. 5) to a position at right angles to the axis of the mixing chamber or closed horizontal position. At the same time the air-valve has shifted to uncover a greater area of intake opening. For these positions of the respective valves the engine will now be running at low throttle, though it may be speeded up at any moment by moving the lever a to the notch opposite the "Open" mark on the sector e about which the lever swings, thereby throwing the valves wide open, or the lever a may be swung to any notch intermediate the "closed" and "open" position of the throttle. The sector e has also marked thereon the word "Start" opposite the notch to which the lever a is swung to bring the valves to cranking or starting position (Fig. 5). When the engine is running at low throttle, the only available passage for the mixture to the motor is the leakage of the valve, which obviously would be insufficient for the purpose of operating the engine. I accordingly provide a "vacuum" by-pass, (that is, a by-pass for the mixture, leading to the vacuum chamber 43 beyond the throttle valve), such by-pass being preferably formed in the stem of the general-adjustment needle valve as already explained in the form of the passages 37, 40, 41, 42, and ports 39. For slow running, the quantity of mixture supplied to the chamber 43 (and hence to the motor) through this by-pass (when the throttle is not completely closed) is ample, and likewise perfect. It remains perfect for all positions of the throttle valve between the points of low throttle and full open position, whether the valve be opening or closing, and it is to this perfection in the mixture that the success of the present carbureter is due. After the engine is speeded up to any desired point it may subsequently be brought to a standstill by disconnecting the gearing as well understood, and allowing the machine to stand with the engine running at low throttle; or, if it be desired to crank the motor for starting purposes, the engine may be stopped when bringing the machine to a stand-still by breaking the sparking circuit by throwing open the spark switch and swinging the throttle to starting position. From this position the engine may subsequently be started by cranking or "on the spark" as already described.

In swinging the throttle valve 26 from closed to starting position (that is, opening the valve backward for starting) the flanges 27 thereof must first pass their respective pockets 28. By means of the pockets a "quick" opening is effected since the mixture can pass with increased volume and freedom past the valve by reason of the enlargement of the space between the flanges and the walls of the pockets; and when the valve is swung forward to open position for speeding (that is, running at a speed higher than under low or closed throttle) the opening is not only "slow" or gradual by reason of the but slight or limited under-cut given to the flange, but is enlarged by progressive increments from the moment the valve begins its forward opening movement, after it leaves its closed position, (Fig. 12). This undercut of the flange (instead of conforming the curvature thereof to the arc described by the valve) makes it possible for the edge of the valve to touch the walls of the cylinder 2 at a tangent point only when the valve is in its closed position, or at right angles to the axis of the cylinder. The moment it leaves such closed position, the edge of the valve (that is, the points of the edge as are far enough removed from the axis of rotation of the valve to describe any perceptible arc) recedes from the cylinder wall and the undercut of the flange prevents any subsequent contact with the wall, so that the mixture is not only free to pass to the chamber 43 and to the motor, but flows to its destination by a succession of progressively enlarging increments according to the degree of curvature or undercut imparted to the flanges.

Since the general adjustment valve 34 must be shifted longitudinally to accurately regulate the discharge from the mouth of the aspirator 33, the chamber 40 is made of sufficient length to at all times allow the ports 41 to discharge thereinto no matter to what position the valve may have been adjusted. The aspirator of course, derives its supply from the float chamber 1 to which the gasolene is admitted by the fall of the float with the dropping of the level of the liquid within the chamber. The float resting as it does on what corresponds to the long arm of the frame or fork lever pivoted to the bracket 14, tilts the short fork arm upwardly thus picking up the weighted feed-valve 16 and admitting a given quantity of gasolene flowing through the pipe p. As stated above, the weight of the valve is made as light as possible to minimize the resistance thereof to the action of the float, and yet accurately apportioned to overcome any undue tendency to vibrate while the machine is running, thus preventing flooding of the float chamber.

Supplementing what has already been said in connection with the description of the invention it may be added that the gasolene of the rich mixture produced under the backward partial opening of the gas-valve and total closure of the air-valve (excepting of course the permanent opening at one end of the valve through which the air is always free to pass) is initially vaporized at the discharge end of the aspirator or nozzle 33, being that this end is in direct communication with the vacuum by-pass 37 of the general adjustment valve (for which any equivalent might be substituted as already explained) which by-pass communicates with the high vacuum present in the chamber 43 immediately above the gas-valve when said valve is in starting position. Obviously, it is to the influence of this vacuum that the vaporizing is due. Without the aid of the by-pass the mixture flowing from the aspirator would, if compelled to travel through the mixing chamber in a direct upward passage lose a considerable portion of the gasolene, the latter dropping out of the mixing chamber. Of course, the highest vacuum in the chamber 43 would be reached when the gas valve was in its closed position, in which case the by-pass would be most effectively called into requisition, since the current induced in the by-pass by virtue of this high vacuum picks up the gasolene discharged by the aspirator, conveying it to the chamber 43, the gasolene being completely vaporized as it is being projected into said chamber from the discharge end of the by-pass, or passage 42.

The relation of the air and gas valves is such that a rich mixture such as is relied upon for starting begins to form from the moment the gas-valve starts on its backward opening stroke, being richest when the valve has reached the limit of such stroke or starting position; and the formation of this mixture results from the fact that the air valve continues to close while the gas valve is opening, thereby increasing the suction on the aspirator. In the present invention these valves are so connected that the air valve continues to close not only while the gas valve is moving backward from an open to a closed position, but after it has continued in such backward movement to effect a second open position, namely that identified with the position of the valves for starting (Fig. 5).

The mixing chamber is vertical to prevent any possible accumulation of gasolene therein, thereby producing what is known as a "quick acting carbureter" and making the car "snappy." Such features of construction as are shown but not referred to are well known and hence require no description.

Having described my invention, what I claim is:—

1. A carbureter having a mixing chamber provided with a valve-controlled air-intake or opening and a series of individually adjustable devices independent of the valve for regulating the size of the opening.

2. A carbureter having a mixing chamber provided with an air-intake or opening, a reciprocating valve for controlling the same, and devices independent of the valve for regulating the size of the opening along any point of the stroke of said valve.

3. A carbureter having a mixing chamber provided with a valve-controlled air-intake or opening, and devices located adjacent thereto for regulating the dimensions of said opening at any point along the line of travel of the valve.

4. A carbureter having a mixing chamber provided with an air-intake or opening, a reciprocating valve for controlling the same, and devices located adjacent to the opening for regulating the dimensions thereof at any point of the stroke of said valve.

5. A carbureter having a mixing chamber provided with an air-intake or opening, a reciprocating valve for controlling the same, and devices located contiguous to the valve for regulating the dimensions of the opening at any point of the stroke of the valve.

6. A carbureter having a mixing chamber provided with an air-intake or opening, a sliding valve for controlling the same, and series of juxtaposed screws distributed along the line of travel of the valve and projecting over the opening.

7. A carbureter having a mixing chamber provided with an air-intake or opening, a sliding valve for controlling the same, and series of juxtaposed screws distributed on each side of the valve along the line of travel thereof and projecting over the opening.

8. A carbureter having a mixing chamber provided with an air-intake or opening, a sliding valve for controlling the same, and series of adjustable cut-offs or air intercepting devices distributed along the line of travel of the valve and projecting over the opening.

9. In a carbureter, a mixing chamber having a valve-controlled air intake or opening at one end, and a valve controlled gas outlet at the opposite end, and independently controllable devices for collectively proportioning the areal dimensions of the intake along the path of travel of the valve controlling said intake, whereby a perfect mixture is effected at all positions of the gas valve between its closed and full open positions.

10. In a carbureter, a mixing chamber having a valve-controlled air-intake and a valve-controlled gas outlet, and means for moving the gas-valve in a given direction to closed position and subsequently to a partial open position by a continuation of the aforesaid movement during the closing movement of the air-valve.

11. In a carbureter, a mixing chamber having an intake air opening, a slide-valve for controlling the same, a rotatable gas-valve, and intermediate connections for oscillating the gas-valve forward to open position for a movement of the air-valve to open position, and for oscillating the gas-valve backward first to closed and subsequently to a partial open position for a movement of the air-valve to closed position.

12. In combination with a carbureter mixing chamber having a valve-controlled air intake, and a valve-controlled gas outlet, link connections between the valves for moving the gas-valve in a given direction to effect closing thereof, and subsequently opening the same by a continuation of the movement thereof in the same direction, during the closing movement of the air-valve.

13. A carbureter having a mixing chamber provided at one end with a valve-controlled air intake, and at the opposite end with a valve-controlled gas outlet, a vacuum chamber beyond the gas-valve, a nozzle discharging into the mixing chamber between the valves, and a member provided with a by-pass terminating at one end at the point of discharge of the nozzle and at the other end at the vacuum chamber for conducting the mixture from the mixing chamber to the vacuum chamber.

14. A carbureter having a mixing chamber provided at one end with a valve-controlled air-intake, and at the opposite end with a valve-controlled gas-outlet, a vacuum chamber beyond the gas valve, an aspirator discharging into the mixing chamber, a general-adjustment valve for controlling the discharge end of the aspirator, the valve having a passage formed therein communicating respectively with the mixing chamber at a point near the mouth of the aspirator and with the vacuum chamber, whereby the mixture is partially drawn through the passage of the general adjustment valve into the vacuum chamber through said passage.

15. In a carbureter, a vertically disposed mixing chamber having valve-controlled air-intake and gas outlet openings at opposite ends thereof, a nozzle or aspirator discharging at a point between the valves, a vacuum chamber above the gas-valve, and a member provided with a by-pass terminating at one end at the point of discharge of the nozzle and at the opposite end at the vacuum chamber.

16. In a carbureter, a mixing chamber provided with a valve-controlled gas outlet, and having inwardly opening pockets formed in the walls in the path of movement of the valve, whereby a quick opening is effected.

17. In a carbureter, a mixing chamber having a valve-controlled air-intake, a gas outlet, a rotatable valve controlling said outlet, pocket formations disposed along the inner walls of the mixing chamber and occupying a position in the path of travel of the gas valve when said valve is rotating backward from a closed to a partially open position in response to a closing movement of the air-valve and intermediate connections to effect the aforesaid response between the valves.

18. In combination with a mixing chamber, a rotating valve mounted therein and provided with marginal flanges deflected interiorly to the arc described by the edge of the valve in its rotation about its axis.

19. In combination with a cylindrical mixing chamber having a gas-outlet, a butterfly or rotatable disk-valve controlling said outlet, and marginal flanges on the disk curved interiorly to and tangentially meeting the curvature of the arc described by the disk in its rotation.

20. In a mixing chamber, a rotatable disk valve having marginal flanges on either side of the axis of rotation, and disposed interiorly to the curvature of the arc described by the edge of the disk in its rotation.

21. In a mixing chamber, a disk valve rotatable about a central axis, and provided with marginal flanges extending on opposite sides of said axis from the opposite faces of the disk, the flanges being deflected interiorly to the curvature of the surface described by the edge of the disk.

22. In a carbureter, a mixing chamber having an air intake at one end, a valve for controlling said opening, said valve having a permanent passage or opening formed therein for a constant limited influx of air into the chamber, a valve-controlled gas outlet at the opposite end, an aspirator discharging into the mixing chamber, a vacuum-chamber beyond the gas-valve, means for effecting a partial quick opening of the gas-valve with a movement of the air-valve to its closed position, and a member provided with a by-pass terminating at one end at the discharge end of the aspirator or nozzle and at the other end at the vacuum-chamber for conducting a portion of the gasolene to the vacuum chamber whereby the same is vaporized.

23. In a carbureter, a mixing chamber provided with a valve-controlled air-inlet and a valve-controlled gas outlet, a nozzle discharging into the chamber between the valves, connections between the valves for effecting a partial opening of the gas-valve for a closed position of the air-valve, and a member provided with a by-pass establishing communication between the point of discharge from the nozzle and a point beyond the gas-valve for conducting a portion of the gasolene and air from the nozzle and mixing chamber to said point beyond the gas-valve, thereby vaporizing the gasolene.

24. In a carbureter, a mixing chamber having a gas-outlet valve movable from its closed position in one direction for effecting a gradual opening, and suitable pockets on the chamber walls coöperating with said valve for effecting a quick opening with the movement of the valve in the opposite direction.

25. In combination with a carbureter mixing chamber having a valve-controlled air-intake, and a valve-controlled gas outlet, connections between the valves for effecting a gradual opening of the gas-valve from its closed position for an opening movement of the air-valve, and a gradual closing of the gas-valve from an open position, and a subsequent quick opening thereof, with a closing movement of the air-valve.

26. In combination with a carbureter mixing chamber having a valve-controlled air-intake, a gas-outlet, a rotatable throttle valve controlling said outlet and having a sweep in either direction from its closed position, link connections between the valves for permitting the conjoint operations of the valves, and pocket formations in the wall of the mixing chamber located opposite the path of movement of the throttle valve.

27. In a carbureter mixing chamber, an air-intake valve and a gas-outlet valve, and means for effecting a gradual opening of the gas outlet valve from a closed position for an opening movement of the air-valve, and a gradual closing of the gas-outlet valve from an open position and a subsequent quick opening thereof for a closing movement of the air-valve.

In testimony whereof I affix my signature, in presence of two witnesses.

CYRUS A. HAAS.

Witnesses:
EMIL STAREK,
JOS. A. MICHEL.